US007761441B2

(12) United States Patent
Chung

(10) Patent No.: US 7,761,441 B2
(45) Date of Patent: Jul. 20, 2010

(54) COMMUNITY SEARCH SYSTEM THROUGH NETWORK AND METHOD THEREOF

(75) Inventor: Hyun Joo Chung, Seoul (KR)

(73) Assignee: NHN Corporation, Seongnam-si (KR)

( * ) Notice: Subject to any disclaimer, the term of this patent is extended or adjusted under 35 U.S.C. 154(b) by 242 days.

(21) Appl. No.: 11/602,725

(22) Filed: Nov. 21, 2006

(65) Prior Publication Data

US 2007/0067288 A1    Mar. 22, 2007

Related U.S. Application Data

(63) Continuation of application No. PCT/KR2005/001302, filed on May 4, 2005.

(30) Foreign Application Priority Data

May 27, 2004  (KR)  ....................... 10-2004-0037825

(51) Int. Cl.
*G06F 17/30* (2006.01)
(52) U.S. Cl. ................. 707/706; 707/723; 707/752; 707/753; 707/754
(58) Field of Classification Search ............. None
See application file for complete search history.

(56) References Cited

U.S. PATENT DOCUMENTS

| 6,594,654 | B1 | 7/2003 | Salam et al. | |
|---|---|---|---|---|
| 6,684,218 | B1* | 1/2004 | Santos et al. | ............... 707/102 |
| 7,249,124 | B2 | 7/2007 | Sasaki et al. | |
| 7,266,546 | B2 | 9/2007 | Son | |
| 7,302,467 | B2* | 11/2007 | Matsuda et al. | ............. 709/204 |
| 2002/0103806 | A1 | 8/2002 | Yamanoue | |
| 2003/0009497 | A1* | 1/2003 | Yu | .............................. 707/513 |
| 2003/0101166 | A1 | 5/2003 | Uchino et al. | |
| 2003/0120649 | A1 | 6/2003 | Uchino et al. | |
| 2003/0167263 | A1 | 9/2003 | Sasaki et al. | |
| 2003/0187834 | A1 | 10/2003 | Oda et al. | |
| 2003/0220922 | A1 | 11/2003 | Yamamoto et al. | |
| 2004/0068495 | A1 | 4/2004 | Inaba et al. | |
| 2004/0153444 | A1 | 8/2004 | Senders et al. | |
| 2004/0249811 | A1* | 12/2004 | Shostack et al. | ............... 707/5 |
| 2004/0267734 | A1 | 12/2004 | Toshima | |
| 2007/0050346 | A1 | 3/2007 | Goel et al. | |

FOREIGN PATENT DOCUMENTS

| JP | 11-312177 | 11/1999 |
|---|---|---|
| KR | 10-2000-0037362 | 4/2000 |
| KR | 10-2000-0050117 | 5/2000 |

OTHER PUBLICATIONS

International Search Report and Written Opinion of ISA dated Aug. 18, 2005 for PCT/KR2005/001302 filed on May 4, 2005.

* cited by examiner

*Primary Examiner*—Baoquoc N To
(74) *Attorney, Agent, or Firm*—H.C. Park & Associates, PLC

(57) ABSTRACT

Disclosed is a community search system and method through a network. When a search word is provided by a user through the network, communities with information corresponding to the search word are searched. Reliabilities of the searched communities are estimated. The searched communities can be sequentially arranged according to the estimated reliabilities, or communities having reliability greater than a predetermine value can be selected and provided to the user. According to some embodiments of the present invention, communities that provide reliable contents are searched on the network, and are provided to the user.

21 Claims, 5 Drawing Sheets

# COMMUNITY SEARCH SYSTEM THROUGH NETWORK AND METHOD THEREOF

CROSS REFERENCE TO RELATED APPLICATIONS

This application is a continuation of PCT International Application Number PCT/KR2005/001302, filed on May 4, 2005, designating the United States of America and published in the English language, which claims priority under 35 U.S.C. §119 to Korean Application Number 10-2004-0037825 filed on May 27, 2004. The disclosures of the above-referenced applications are hereby expressly incorporated by reference in their entireties.

FIELD OF THE INVENTION

The present invention relates to a search system and a method thereof. More specifically, the present invention relates to a community search system on the network and a method thereof.

DESCRIPTION OF THE RELATED ART

As the Internet has been widely used, Internet-based electronic commerce for people all over the world has been performed, communication between users has been developed, and various types of communications have been provided on the Internet.

Internet telephones that will replace cable telephones have been used in addition to electronic mail and file transmission, which are the most basic Internet communication tools, and it is also possible to use the Internet transmit short messages to a mobile phone. A chat system is an Internet-based multi-user communication system, and voice chat systems and video chat systems have been developed on the Internet in addition to text chat systems. Communities in which a plurality of users gather together and communicate documents or opinions on the same topic also exist.

The community has various items such as cafés, blogs, homepages, clubs, and mini-homepages, and communities can focus on various specific subject matters. In general, respective users who are registered as members of the cafés or clubs post contents or data on a predetermined topic on the notice boards, and users who have opened blogs or mini-homepages post their opinions or data on the bulletin boards.

It is conventionally necessary to directly access a community and find specific contents posted in the community that the user desires to watch or receive. A contents search process based on a search word can be performed for respective categories such as web documents, news, images, and dictionaries when the user only inputs the search word corresponding to the desired contents on the web browser. The search process consists of searching the contents that correspond to the search word from among the contents (or data) posted in the communities. Therefore, the user can easily search for predetermined contents posted in the community without individual access to the community, and easily know the community that has information related to the search word. However, many of the contents provided by the searched community are not useful.

Also, search results are provided based on quantities, that is, the number of members of the communities and the number of articles on the bulletin boards. In other words, the search results display the communities ranked by the prevalence or volume of the search word in the community However, many communities have a large number of members thereby increasing the probability of the the search word occurring but the contents of the communities are not necessarily useful. Therefore, there is a problem in which the user cannot receive useful information when the user accesses the community displayed on the search report page.

SUMMARY OF THE INVENTION

Figure 1:
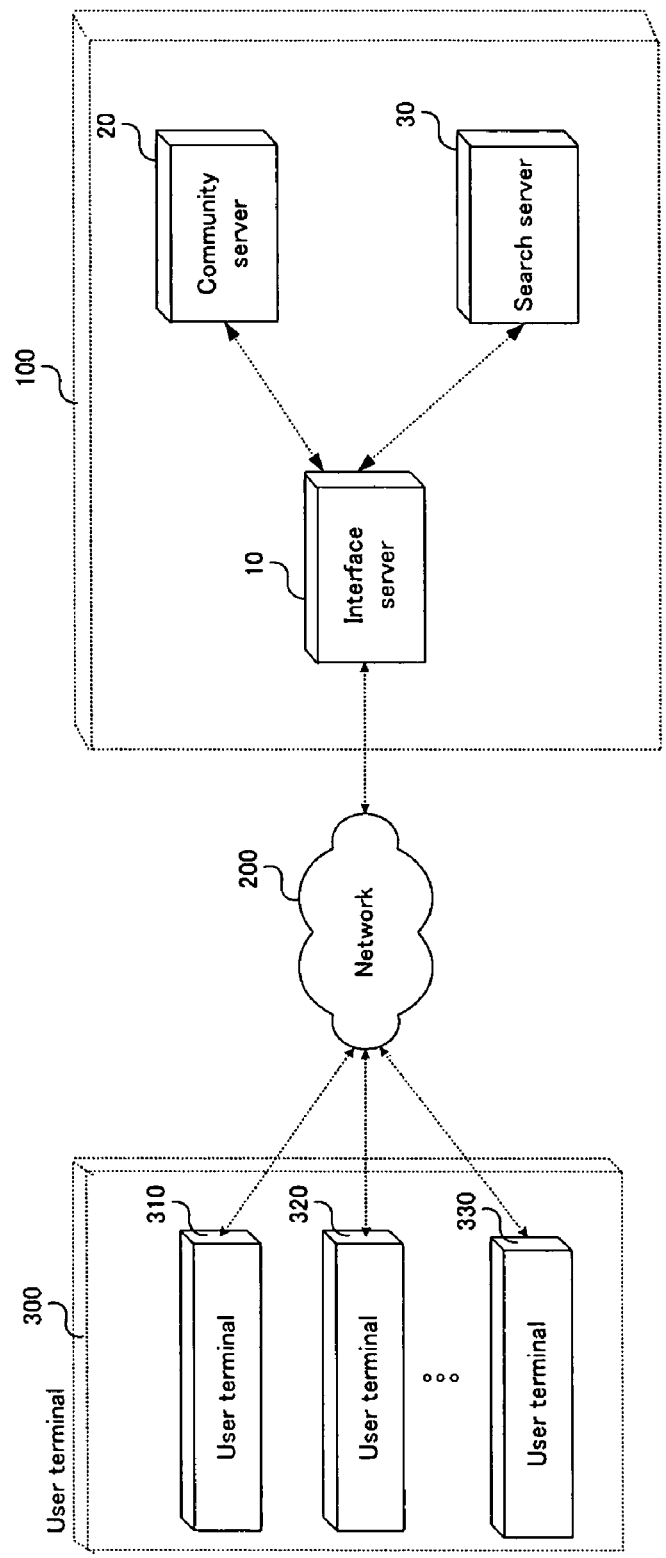
FIG. 1 shows a configuration diagram of a community search system on the network according to an embodiment of the present invention.

Disclosed are methods and systems that can search communities of a network and provide reliable search results. Further, disclosed methods and systems can estimate community reliabilities that indicate reliabilities of the contents provided by the communities and can provide search results to the user according to the estimated reliabilities.

DETAILED DESCRIPTION OF THE PREFERRED EMBODIMENTS

In the following detailed description, preferred embodiments of the invention can be shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

In one aspect of the present invention, a method for searching communities for providing contents on the network comprises: a) searching communities having information corresponding to a search word when the search word is provided by a user through the network; b) estimating reliabilities on the searched communities; and c) providing information on the searched communities to the user according to the estimated reliabilities.

Another aspect of the present invention is a system that is connected to a plurality of user terminals through a network and that searches communities on the network. The system comprises: a searcher for searching communities having information corresponding to a search word, wherein the search word is provided from a user terminal through the network; a reliability estimator indicating the reliability of the information corresponding to the search word from each searched community; and a search result provider for providing searched communities to the user according to the estimated reliability.

After a search word is provided by a user, communities having information corresponding to the search word can be searched. In preferred embodiments, the communities that satisfy predetermined rules can be searched. In most preferred embodiments, communities that include a topic comprising input search word or include contents corresponding to the search word can be searched. Reliabilities can be assigned to the respective communities depending on the extent of the established rules that the communities satisfy. Search report pages can be determined, at least in part, from the assigned reliabilities of the communities, and the search report pages can be provided to the user. In some embodiments, the search report pages can be generated in the order from the community with the highest reliability to the community with the lowest reliability. In other embodiments, the search report pages can be determined, at least in part, by selecting the communities with reliabilities that are greater than a predetermined reference, and the corresponding search report pages can be provided to the user.

The communities in the embodiment include any types of communities that can be generated on the network. For example, the communities can include a shared community (e.g., a café or a club) in which users can be members and can communicate data or opinions on a single topic, and can include personal communities (e.g., a blog, a personal homepage, a mini-homepage, or a profile) that a single person manages and in which the person posts contents such as his data or opinions. The contents according to the embodiment can include notes to be posted in the shared or personal community, or images and moving pictures attached to the notes.

References for indicating the reliabilities of communities are given below.

1. Community User Reliability Index

The community user reliability index represents a sum of reliability indices of all users registered to a corresponding community, wherein each reliability index indicates how reliable, useful, pertinent, interesting, and/or relevant the information the corresponding user provides is. The user's reliability index can be estimated according to the user's network activity. For example, the network activity can be determined, at least in part, by the frequency that a user answers a question provided by another user in a knowledge share service on the Internet, and in this instance, the user's reliability index can be determined, at least in part, by the frequency of the user's replies to questions and by the rate of how many replies are selected from among the provided replies (i.e., a reply selection rate). Also, the network activity need not be restricted to the above-noted knowledge share service and can include all activities for providing information on the network. The user's reliability index can include a sum of compensation means (e.g., mileage points) provided by a system depending on the activity results.

In addition, the community user reliability index can be determined, at least in part, by values indicating how many times other users have used the contents from the community user. For example, the first user's reliability index can be estimated depending on a value (e.g., the number of scrapped times) that indicates how many times second users have scrapped the contents posted by the first user. The community user reliability index can be generated by a sum of reliability indices of the first users.

2. Community Activity Index

The community activity index can indicate how many contents the community has provided and received, and it can be determined, at least in part, from the sum of activity indices of community members, the number of visitors, and/or the number of connected relationships. The activity index of a member can be estimated by the corresponding user's community activity. For example, the community activity can represent the user's posting of contents in the community, and the user's activity index in this instance can be determined, at least in part, by how many new contents the user has posted for an established period (e.g., a recent period with respect to the present time). Also, the community activity index can be determined, at least in part, by the number of users who have visited the corresponding community, which is based on the case in which the number of other users who visit the community to which the user belongs can be increased when the users of communities provide further useful and reliable contents.

Also, the community activity index for a personal community can be determined, at least in part, by the number of other communities that have a predetermined relationship with the corresponding community. In one embodiment related to a personal community, such as a blog, a second personal community can form a predetermined relationship of a neighbor with a first personal community in a like manner of a "neighbor personal community." When a neighbor personal community relationship is formed, a link for an access to the second personal community is displayed on the first personal community, and users who access the first personal community can easily access the second personal community without an additional search process. The community activity index can be determined, at least in part, by the number of other communities having a predetermined relationship (the number of formed relationships.)

As described, the community activity index can be determined, at leas tin part, by at least one factor including the sum of activity indices of members, the number of users having visited the corresponding community (the number of visitors), and the number of formed relationships, and is not restricted to the current embodiment.

3. Volume of Community

The volume of a community can be determined, at least in part, by the number of users registered to the community and/or the number of contents posted in the community.

As described, the reliability of a community can be estimated by considering at least one of the community user reliability index, the community activity index, and the volume of the community. However, it can be undesirable to estimate the community reliability only based on the volume of the community, and it can be desirable to estimate the community reliability by including at least one of the community user reliability index and the community activity index. Factors for estimating the reliability according to the embodiment are not restricted to the described embodiment.

The reliability of the corresponding community can be estimated with different references depending on the type of community. For example, the process for searching shared communities, such as a café, can be performed by considering the community user reliability index, the community activity index, and/or the volume of the community, and the process for searching personal communities, such as a blog, can be performed by considering the community activity index.

A detailed configuration and operation of the community search system on the network according to the embodiment will now be described.

Figure 2:
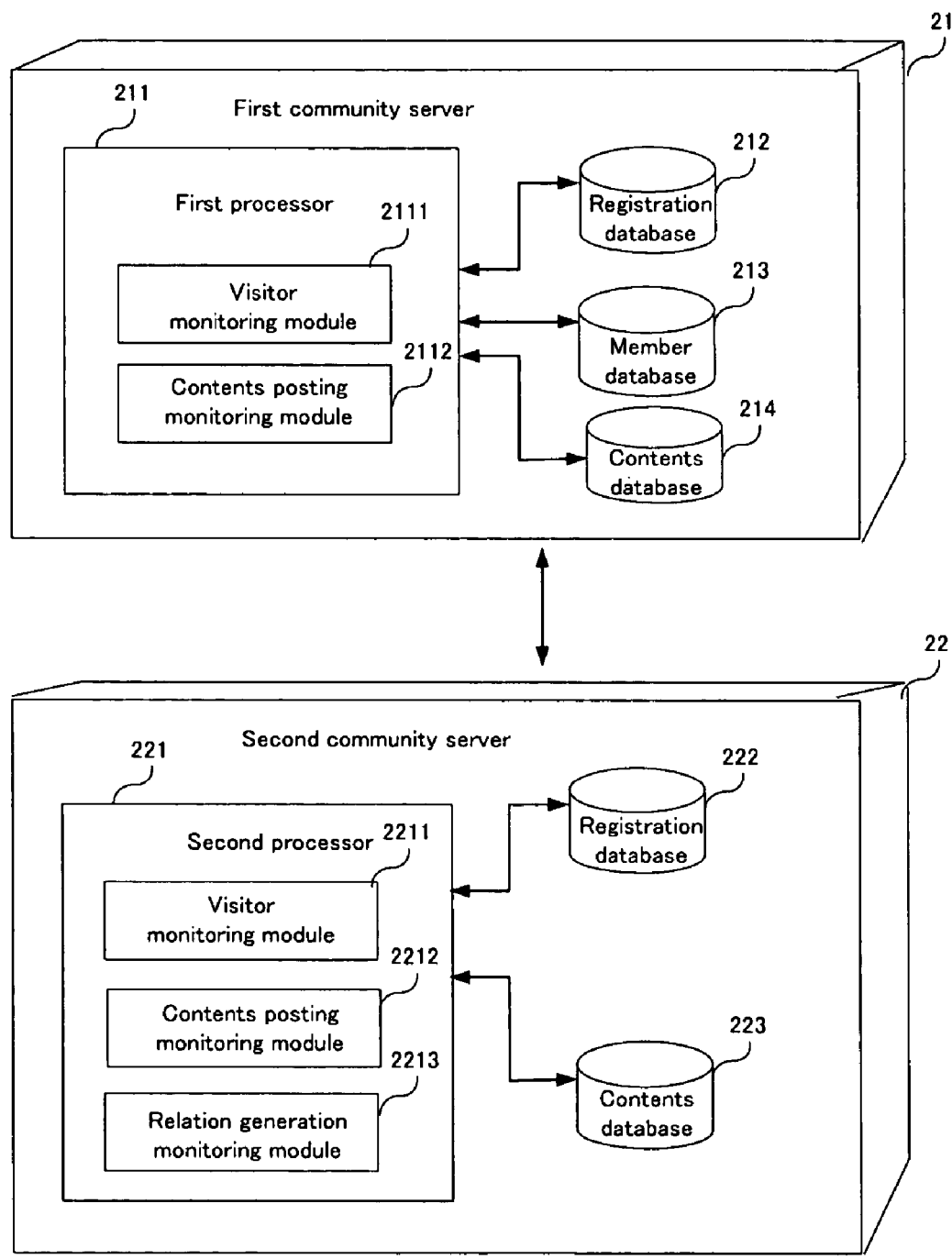
FIG. 2 and FIG. 3 respectively show a detailed configuration of a server in the community search system shown in FIG. 1.
Figure 3:
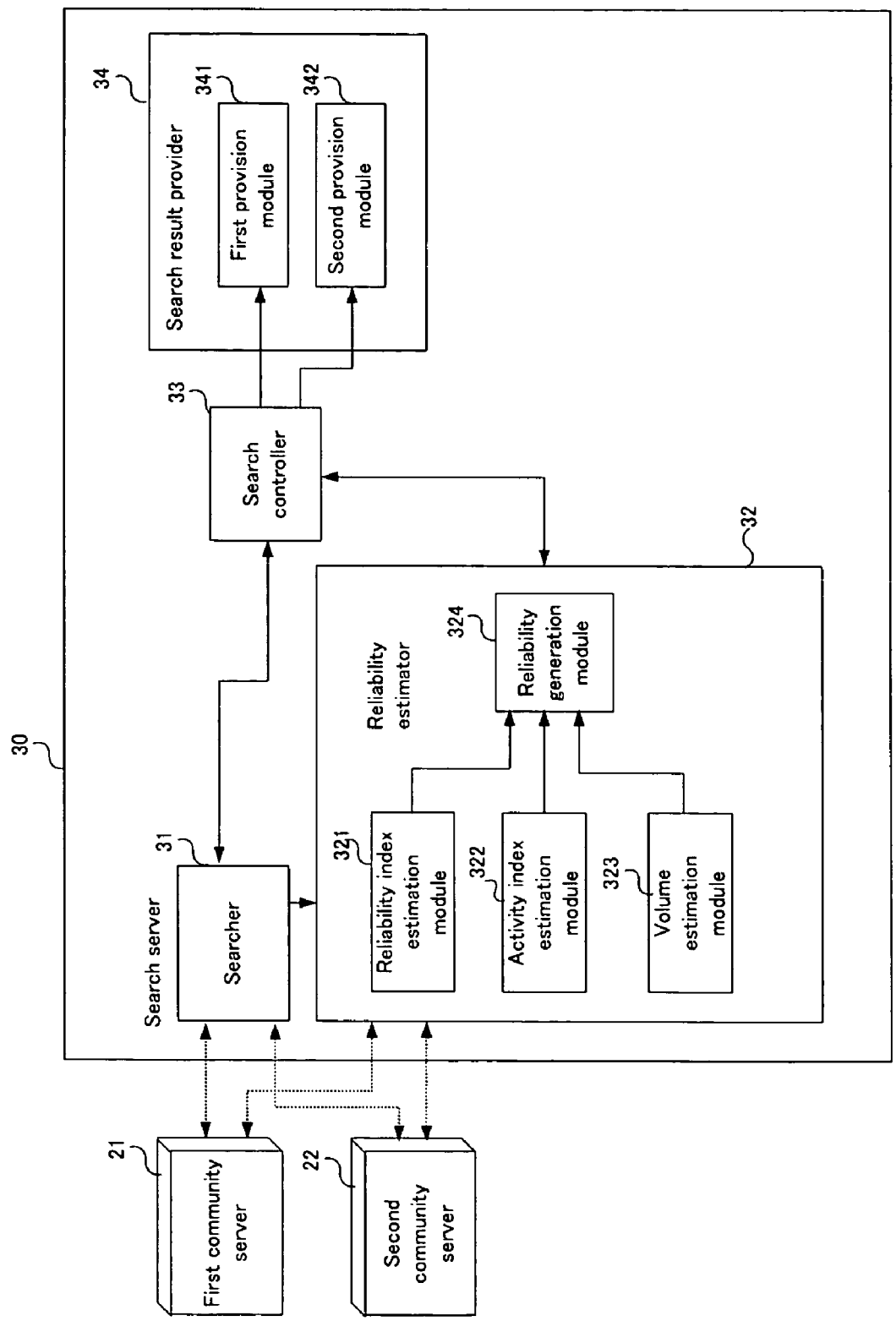

FIG. 1 shows the community search system on a network according to one embodiment, and FIG. 2 and FIG. 3 respectively show a detailed configuration of a server.

The community search system 100 can provide a search service to users through the Internet or wireless communication networks. As shown in FIG. 1, the community search system 100 is connected to a plurality of user terminals 310, 320, 330, . . . (referred to as 300 for ease of description) through a network 200 (various types of networks including a telephone network, the Internet, and/or a wireless communication network.)

The user terminal 300 is a communication device for accessing the community search system 100 through the network 200, and can include a cable telephone, a mobile terminal, a computer, and/or an Internet TV. Therefore, the user can easily and quickly access the community search system 100 by using the PC communication, the Internet, the wireless Internet, and/or the telephone network.

The system 100, which can be connected to the user terminal 300 and can provide a search service to a plurality of users, can include an interface server 10, a community server 20, and a search server 30.

The interface server 10 can control a plurality of terminals 300 to access the system 100 through the network 200, in particular, the Internet or the wireless Internet, can convert various categories of information provided through the servers 20 and 30 according to a communication standard and can provide converted information to the terminals 300 through the network 200, or can receive information from the terminal 300 through the network 200 and can provide the information to the servers 20 and 30 thereby functioning as a WEB server or a WAP server.

The community server 20 for providing a community service can include a first community server 21 for providing and managing a shared community and a second community server 22 for providing and managing a personal community as shown in FIG. 2. The respective community servers 21 and 22 can include a database for storing information on the community and a processor for generating and managing a community between users based on the information stored in the database.

In some embodiments, the first community server 21 can include a first processor 211 for forming a shared community and managing contents, a registration database 212 for storing outlined information to indicate what features the shared communities have for the respective formed shared communities, a member database 213 for storing information on the users registered as members to the respective shared communities, and/or a contents database 214 for storing contents of the respective shared communities.

The registration database 212 can store outlined information on the shared communities registered for categories, for example, the registration database 212 can store ID codes of shared communities registered for the respective category codes given according to the categories including broadcasting, entertainment, economics, and politics. It can also store community information including a shared community name, a description on features, shared community manager information (an ID or a nickname), the number of members, and a registration date for each shared community ID code, and it also stores information on the number of visitors who have visited the corresponding community for a predetermined period (e.g., a recent time period).

The member database 213 can store information (i.e., member information) on the users who are members of registered shared communities. For example, in some embodiments, it can store member information including IDs, nicknames, passwords, ages, sex, occupations, and mail addresses of the users who are registered as members corresponding to the shared community ID codes, and can also store reliability indices of the respective users.

The contents database 214 can store information on the contents provided for the respective corresponding shared communities. For example, the contents database 214 can store information including contents posted numbers, contents provider IDs, contents posted dates, contents titles, and contents descriptions corresponding to the shared community ID codes. It can store the number of replies, the number of added comments, the number of mailings, the number of recommendations for the respective contents, and the number of contents (i.e., the number of recent contents) posted for a predetermined period (e.g., a recent time) for each shared community.

The first processor 211 can generate and/or manage shared communities based on the databases 212 to 214 storing the above-described information. In detail, the first processor 211 can generate and register shared communities, authenticate users for the respective shared communities, and/or post and manage contents for the respective shared communities. In particular, the first processor 211 can include a visitor monitoring module 2111 for counting the number of visitors (accessing users except the users who are registered as members to a predetermined shared community) who access the corresponding shared community, and/or a contents posting monitoring module 2112 for checking contents posted by the users registered as members to a predetermined shared community and counting the number of recent contents for each contents posting.

The second community server 22 is a server for providing a personal community to each user and managing the same, and it can also be referred to as a "blog server." As shown in FIG. 2, the second community server 22 can include a second processor 221 for generating personal communities and managing contents, a registration database 222 for storing information on the personal communities, and/or a contents database 223 for storing contents posted by the users for the respective personal communities.

The registration database 222 can store outlined information on the personal communities registered for respective categories. For example, the registration database 222 can store ID codes of personal communities registered for categories, and community information including personal community titles for the respective personal community ID codes, IDs or nicknames of users who have personal communities, reliability indices of the users, and/or registration dates, and can also store information on the number of visitors who have visited the corresponding communities for a predetermined time (e.g., a recent time period) and/or the number of generated relationships of communities for the respective personal communities.

The contents database 223 stores information on the contents provided for the respective personal communities. For example, the contents database 223 can store information including the number, posted dates, titles, and/or descriptions of the contents corresponding to the personal community ID codes. It can store the number of replies, the number of added comments, the number of mailings, and/or the number of recommendations for the respective contents, and it can also store the number of recent contents (i.e., a recent time period) posted for a predetermined period (e.g., a recent time period) for each personal community, and/or activity indices of corresponding users that can be generated based on the number of recent contents.

The second processor 221 can generate and manage personal communities, and can post and manage contents for respective personal communities. Also, the second processor 221 can include a visitor monitoring module 2211 for counting the number of visitors (accessing users except the users who are registered as members to a predetermined shared community) who access the corresponding shared community, and/or a contents posting monitoring module 2212 for checking contents posting by the corresponding users for each personal community and counting the number of recent contents for each contents posting. The second processor 221 can further include a relationship generation monitoring module 2213 for counting the number of generated relationships according to visitors' requesting generation of predetermined relationships with corresponding personal communities. It is described in some embodiments that the second processor 221 for managing personal communities includes a relationship generation monitoring module 2213, and without being restricted to this, the first processor 211 for managing the shared communities can further include a module for performing the same function as that of the relationship generation monitoring module.

In some embodiments, modules for monitoring posting contents to corresponding communities, visitors' accesses, and generation of relationships are generated in the first and second community servers 21 and 22, and the monitoring modules 2111, 2112, 2211, 2212, and 2213 can be separated from the community servers 21 and 22.

The above-configured processors 211 and 221 can increase the number of replies or comments of the corresponding contents when another user (who has not posted the contents) adds a reply or a comment to the contents.

Further, the first and second community servers 21 and 22 can share contents in cooperation with each other. For example, a user can request to post the contents posted in a shared community into the user's own personal community by using a menu such as "Deliver Contents," and in this instance, the first processor 211 of the first community server 21 copies corresponding contents and transmits the same to the second community server 22, and the second processor 221 of the second community server 22 posts the contents in the user's personal community. In this instance, the second processor 221 can show the source of the contents when posting the contents in the personal community.

As shown in FIG. 3, a search server 30 for searching communities according to a search word provided by a user terminal 300 can include a searcher 31 for searching for communities having the search word, a reliability estimator 32 for estimating reliabilities of searched communities, a search controller 33 for controlling operations of the searcher 31 and the reliability estimator 32, and a search result provider 34 for providing searched contents to the user according to the estimated reliabilities.

The searcher 31 can search for communities having contents with a topic corresponding to the search word or contents with a word corresponding to the search word.

The reliability estimator 32 can estimate reliabilities of the communities searched by the searcher 31. In some instances, the reliability estimator 32 includes a reliability index estimation module 321 for estimating community user reliability indices, an activity index estimation module 322 for estimating community activity indices, a volume estimation module 323 for estimating community volumes, and a reliability generation module 324 for estimating reliabilities of corresponding communities based on the results of the respective estimation modules 321 to 323. In some embodiments, the estimation modules 321 to 323 can be determined, at least in part, by the factors used for estimation of reliabilities.

The search controller 33 can operate the searcher 31 and the reliability estimator 32 to search communities, and in particular, selectively drives the respective modules 321 to 323 of the reliability estimator 32 according to established reliability generation factors. For example, the search controller 33 can drive the estimation modules 321 to 323 of the reliability estimator 32 to estimate reliabilities when the three factors (the community user reliability index, the community activity index, and the community volume) to be considered in the search process are established, the search controller 33 can drive the corresponding estimation module to estimate the reliability when one of the three factors is established as an estimation factor, and the search controller 33 can provide searched communities to the search result provider 34.

The search result provider 34 can sort the communities provided by the search controller 33 according to reliabilities, and can provide the sorted communities to the user. The search result provider 34 can include a first provision module 341 for selecting communities that respectively have a reliability greater than a predetermined value and generating a search result page, and a second provision module 342 for sorting information on the searched communities depending on community reliabilities (e.g., in the order from the highest reliability to the lowest reliability) and generating a search result page, and can provide the search result page to the user so that the user can easily know communities that provide reliable contents.

In some embodiments, the first and second community servers 21 and 22 are realized in a single system, and they can be separately realized in different systems. For example, a first system can include the first community server to provide a shared community service, and a second system can include the second community server to provide a personal community service. Also, the database and the processor 221 in the respective servers 21 and 22 can be realized as independent servers to process corresponding functions, and the databases can be combined in a single server. For ease of description, the databases are classified as described above, and other embodiments have different classifications of the databases.

A community search method on the network according to the embodiment will now be described based on the above-described configuration.

Figure 4:
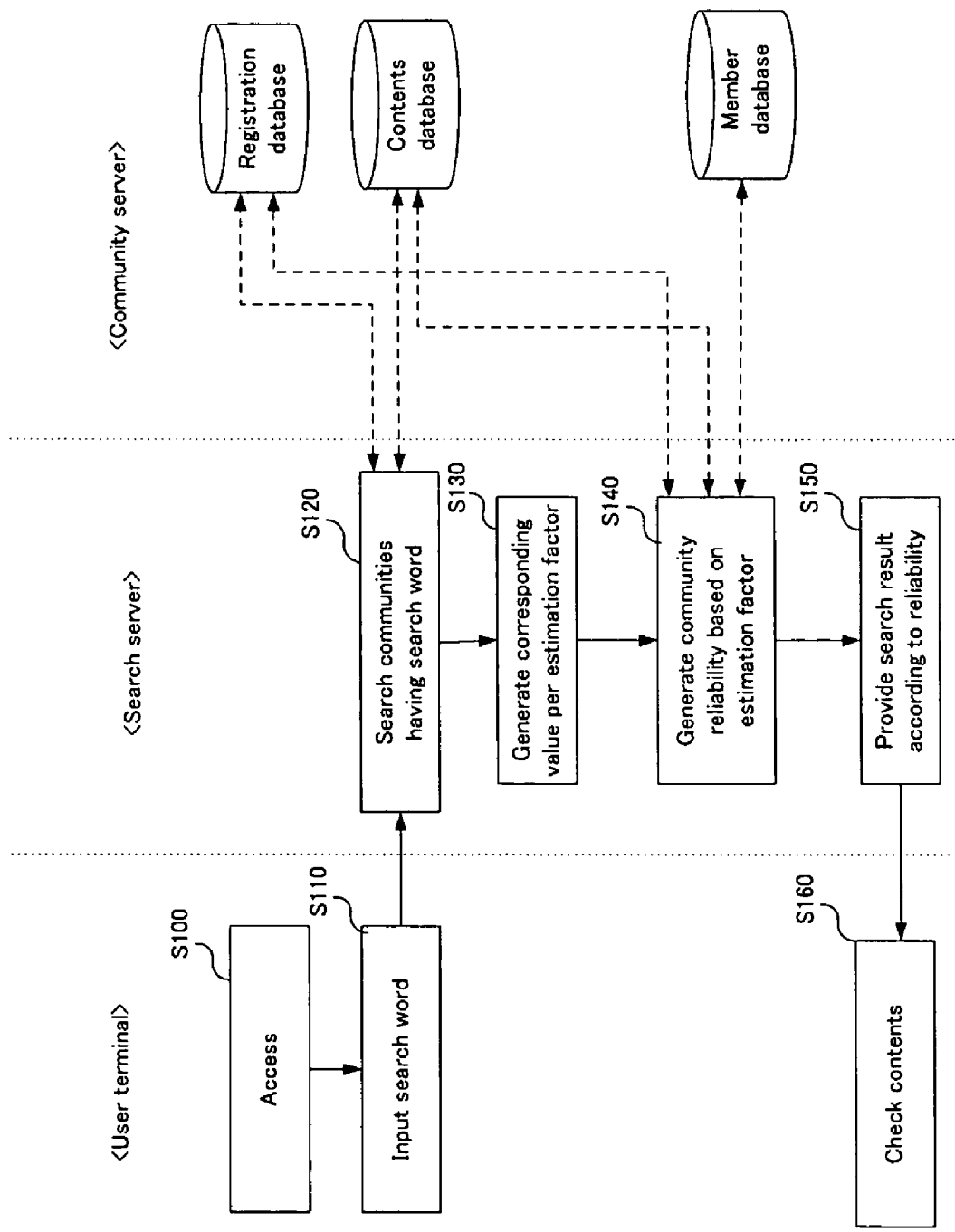
FIG. 4 shows a flowchart for a community search method according to an embodiment of the present invention.

FIG. 4 shows a total flowchart of the community search method.

As shown, a plurality of users can execute a user program provided by the interface server 10 to directly access the search server 30 or directly access the interface server 10 through a web browser to input a search word corresponding to contents to be searched, in order to search for desired contents by using a terminal 300. In this instance, the user can access the initial web page of the system through the interface server 10, access a predetermined web page for providing a community service, and input a search word on a community service web page. For example, the user can access the system 100 to access a shared community service providing page and input a search word or access a personal community service providing page and input a search word in steps S100 and S110.

The search word input by the user can be transmitted to the search server 30 and the search server 30 can then search communities based on the input search word.

First, the search server 30 can find communities having the input search word. That is, the search server can search the contents databases 214 and 223 of the first or second community server 21 or 22 to search communities having contents with information that corresponds to the input search word, or can search registration databases 212 and 222 of the community server 21 or 22 to find communities with descriptions having the word that corresponds to the search word from among the descriptions on communities in step S120.

Next, the search server 30 can estimate the reliabilities of the searched communities. The search server 30 can find the factors established for estimation of reliabilities and can generate the reliabilities of communities based on the respective factors. That is, at least one estimation factor of the community user reliability index, the community activity index, and the community volume can be established to be an item to be considered for estimation of reliabilities, values of the established estimation factors are found, and the reliabilities of communities can be determined, at least in part, from the found values in steps S130 and S140.

When the reliabilities are determined, the communities searched according to the generated reliabilities can be arranged and provided to the user in steps S150 and S160. In some embodiments, the search server 30 can arrange the searched communities according to the reliabilities, and provides the same to the user.

The search stages S120 to S150 in the search process will now be described in further detail.

Figure 5:
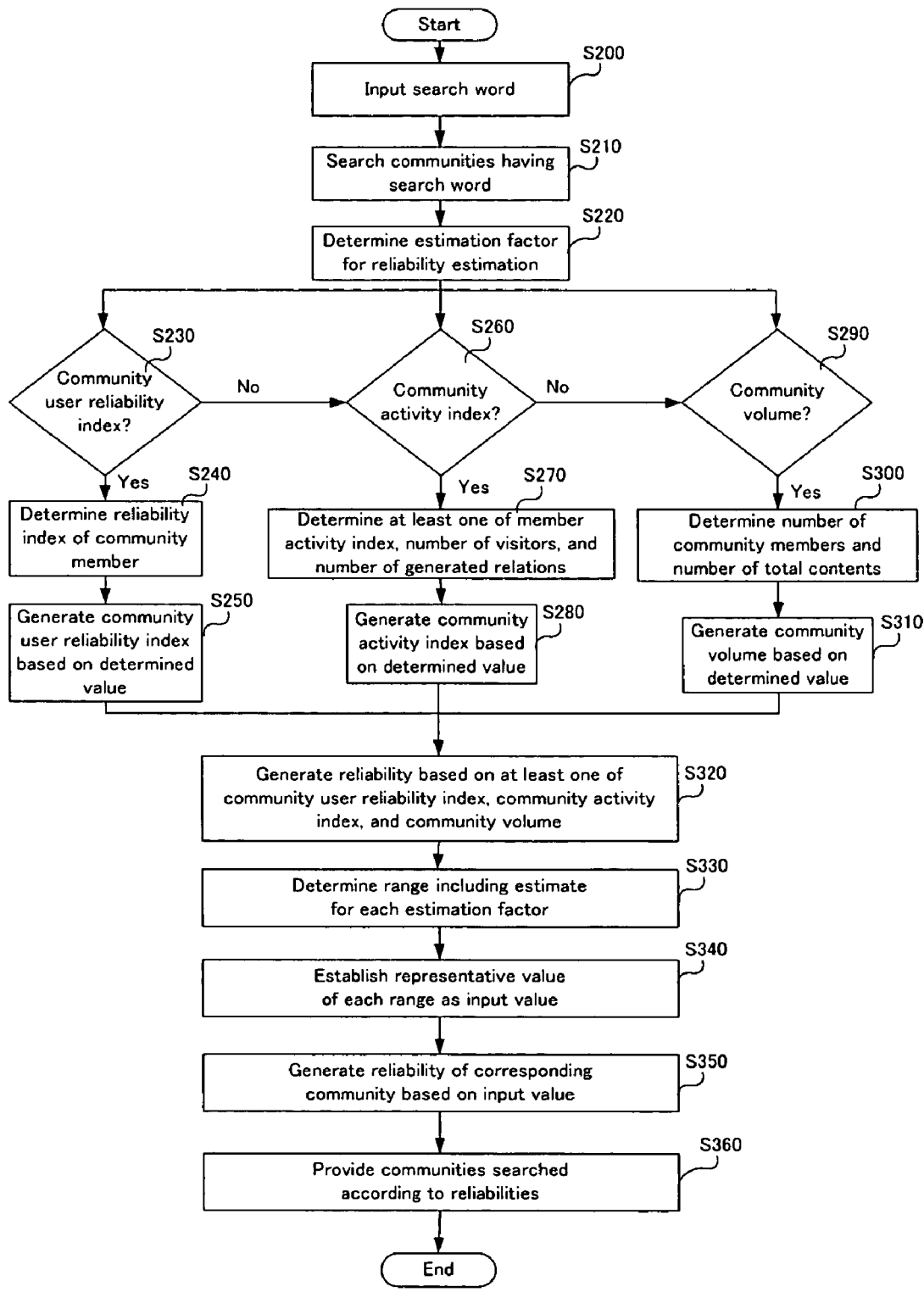
FIG. 5 shows a detailed flowchart for the search stage shown in FIG. 4.

FIG. 5 shows a detailed search process of the search server.

As shown, when a search word is provided, the search controller 33 of the search server 30 can drive the searcher 31 to search for communities having information on the search word. The searcher 31 can search the contents databases 214 and 223 of the respective community servers 21 and 22 to find the communities having the contents including the search word, or can search the registration databases 212 and 222 of the community servers 21 and 22 to find communities having community descriptions or titles having the search word in steps S200 to S220. In some embodiments, the searcher 31 can selectively search the communities according to word frequencies for showing how many words corresponding to the search word are included or the matched status with the corresponding search word.

When the communities having information corresponding to the input search word are searched, the search controller 33 can selectively drive the estimation modules 321 to 323 of the reliability estimator 32 according to the established estimation factors. For example, the search controller 33 can drive the reliability index estimation module 321 when the community user reliability index is established as an estimation factor to be considered for reliability estimation, and the search controller 33 can drive the activity index estimation module 322 when the community activity index is established as an estimation factor. In addition, the search controller 33 respectively can drive at least two corresponding estimation modules when a plurality of estimation factors are established. In this instance, the corresponding estimation modules can be concurrently driven to perform estimation or the same can be sequentially driven to perform sequential estimation.

The respective estimation modules 321 to 323 of the reliability estimator 32 can find values corresponding to estimation factors.

In detail, the reliability index estimation module 321 can search the member database 213 of the first community server 21 based on the ID of the shared community, find reliability indices of respective users registered as members to the shared community, sum the reliability indices of the users, and/or determine a community user reliability index when the search community is a shared community. The reliability index estimation module 321 can search the registration database 222 of the second community server 22, find the reliability index of the user who has generated the personal community, and/or establish the reliability index as a community user reliability index when the search community is a personal community in steps S230 to S250.

The activity index estimation module 322 can find the number of recent contents, the number of recent visitors, and/or the number of generated relationships for the respective searched communities, and/or can estimate activity indices based on the found values. In some embodiments, when the searched community is a shared community, the activity index estimation module 322 can search the registration database 212 of the first community server 21 to find the number of recent visitors based on the IDs of the shared community, search the member database 213 to find the activity indices of community members, and/or determine the community activity index, at least in part, by the operation of summing the activity indices of members and summing the number of recent visitors. Also, when the searched community is a personal community, the activity index estimation module 322 can search the registration database 222 of the second community server 22 to find the number of recent visitors and the number of generated relationships, search the contents database 223 to find the activity indices of the corresponding community manager, and/or determine the community activity index, at least in part, by the operation of summing the found activity index, the number of recent visitors, and the number of generated relationships in steps S260 to S280.

The volume estimation module 323 can search the registration databases 212 and 222 and the contents databases 214 and 223 of corresponding community servers for the respective searched communities, find the total number of members and the total number of contents of the corresponding community, and determine the community volume, at least in part, based on the found values in steps S290 to S310.

As described, the values estimated by the estimation modules 321 to 323 of the reliability estimator 32 can be provided to the reliability generation module 324, and the reliability generation module 324 can determine the reliabilities of the searched communities in step S320, at least in part, based on the values corresponding to the established estimation factors. That is, the reliability generation module 324 can determine the reliabilities of the communities by considering at least one estimation value corresponding to the community user reliability index, the community activity index, and the community volume according to the three estimation factors.

Various methods can be used to generate the reliabilities. In one embodiment, the reliability generation function can be established, and the reliability generation function can determine reliabilities of communities, at least in part, based on weights according to a predetermined input value established based on the estimate for each estimation factor. In this instance, the input value provided as the reliability generation function can include an estimate for each estimation factor.

In particular, in one embodiment, a plurality of established ranges having a representative value for respective estimation factors can be provided, and the representative value of the established range to which an estimate per estimation factor belongs can be determined to be an input value of the reliability generation function in steps S330 and S340. For example, regarding the community activity index, the representative value of the activity index range of 1 to 100 is "50," the representative value of the activity index range of 101 to 200 is "150," and the representative value of the activity index range of 201 to 300 is "250." In this instance, the input value is established to be "150" when the estimated community activity index is 110, and the input value is also established to be "150" when the estimated community activity index is 180.

Accordingly, the representative value can be established according to the range to which the estimate for each estimation factor belongs, the established representative value can be established to be an input value of the reliability generation function, weights can be provided based on the input values, the weights can be applied to the reliability generation function, and the reliability of the corresponding community can be determined in step S350. However, the reliability generation method can include other embodiments, and for example, the method for summing the estimates of estimation factors and generating the reliability can also be used.

As described above, information on the communities searched by the searcher 31 and the reliabilities of respective communities estimated by the reliability estimator 32 can be transmitted to the search result provider 34.

The search result provider 34 can select the communities with a reliability greater than a predetermined value based on the reliabilities of the searched respective communities, generate a search result page and provides the page to the user, and/or sort the communities in the order from the highest reliability to the lowest reliability, and generate a search result page and provides the page to the user in step S360. In addition, the search result provider 34 can generate the search result page by randomly sorting the searched communities. Link information (e.g., community homepages) for a direct access to other communities can be displayed together with the titles of corresponding communities on the search result page, and further information on community descriptions, manager nicknames (or IDs), the number of members, generated dates, directories to which the communities belong, and contents sorting menus of respective communities. The contents sorting menus can represent sorted contents provided by corresponding communities, and include titles of bulletin boards posted for contents of a predetermined topic.

When the contents having information corresponding to the input search word are searched in the above-described community search process, search results on the searched contents can be provided in addition to providing information on the communities as described above. That is, link information for a direct access to the searched contents can be displayed based on the contents titles on the search result page, and a part of contents and the titles of communities in which corresponding contents are posted can be displayed. In this instance, the contents search results can be sorted according to the reliabilities of respective communities according to the described embodiment, or the contents posted in the communities with reliability greater than an established value can be selectively displayed.

In some embodiments, the respective estimation modules 321 to 323 of the reliability estimator estimate estimation factors and the reliability generation module 324 can determine reliabilities of communities according to the estimates, and differing from this, the respective estimation modules 321 to 323 can compare the estimation factors with values established for respective estimation factors and assign grades according to compared differences, and the reliability generation module 324 can finally generate grades of communities, that is, reliabilities based on the grades of estimation factors.

The above-described search method can be realized in a program format to be stored on a computer readable recording medium that includes any kinds of recording devices for storing computer readable data, for example, a CD-ROM, a magnetic tape, and a floppy disk, and can also be realized in a carrier wave format (e.g., Internet transmission).

Communities for providing reliable contents on the network can be searched according to the present invention. Therefore, the user can use reliable contents more conveniently.

Also since the contents are sorted and provided in the order from the highest reliability to the lowest reliability of communities, the user can easily know communities that provide more reliable contents.

Hence, the user can use reliable contents more easily.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

The invention claimed is:

1. A method of operating on-line search services, the method comprising:
   receiving, from a user, a search word for searching communities;
   conducting a search using the search word, thereby locating a plurality of communities, wherein the search is conducted using a computing device comprising a processor and a memory;
   determining a reliability value for each of a plurality of located communities using at least one reliability factor selected from the group consisting of a community user reliability index and a community activity index, the reliability value being indicative of how reliable information from each community is, wherein the community user reliability index for a first one of the plurality of located communities is determined based on reliability indices of users registered with the first community, wherein the community activity index for the first community is determined based on activities of users registered with the first community;
   formulating a search result page such that at least part of the plurality of located communities are arranged based on the reliability values thereof on the search result page; and
   providing the user with the formulated search result page.

2. The method of claim 1, wherein the reliability value of the first community is determined further using a community size of the first community.

3. The method of claim 2, wherein the community size is determined, at least in part, by number of users registered to the first community and/or number of contents posted in the first community.

4. The method of claim 1, wherein the community user reliability index indicates a sum of reliability indices of users registered with the first community, wherein each reliability index of a user indicates reliability of the information provided by the user.

5. The method of claim 1, wherein the community activity index indicates frequency of activities of users registered with the first community, and the community activity index is generated based on at least one of number of contents posted within the first community in a predetermined time, number of users who visit the first community, and number of other communities having a relationship with the first community.

6. The method of claim 1, further comprising:
   providing a plurality of established ranges for potential reliability values, and establishing a representative value for each of the established ranges;
   determining in which established range the reliability value of the community belongs, and assigning the representative value of the determined established range as an input value; and
   applying the input value to a reliability generation function, and generating the reliability of the community.

7. The method of claim 1, wherein each of the plurality of communities contains information comprising at least one selected from the group consisting of a community title, a community description, manager ID information, a number of members, a generation date, a directory to which the community belongs, and a contents sorting menu of the community, wherein the community title has link information for direct access to the corresponding community.

8. The method of claim 1, wherein each of the plurality of communities contains information comprising at least one selected from the group consisting of a contents title, part of the contents, and a community title in which corresponding contents are posted, and the contents title has link information for direct access to the contents having the search word.

9. The method of claim 1, wherein determining the reliability value comprises:
providing the community activity index for the first community, wherein the community activity index represents frequency of activities of users registered with the first community; and
computing the reliability value of the first community using the community activity index.

10. The method of claim 9, wherein determining the reliability value further comprises providing a size of the first community, wherein computing further uses the size of the first community.

11. The method of claim 10, wherein the size of the first community is at least one of the number of users registered with the first community and the number of postings with the first community.

12. The method of claim 9, wherein determining the reliability value further comprises providing user & reliability indices of users registered with the first community, wherein computing further uses user reliability indices.

13. The method of claim 1, wherein formulating comprising placing a link of the first community above or prior to a link of a second one of the plurality of located communities on the search result when the first community has a high reliability value than the second community.

14. The method of claim 1, wherein formulating comprises arranging the at least part of the plurality of located communities based on the reliability values thereof.

15. The method of claim 1, wherein formulating comprises identifying the first community having a reliability value smaller than a pre-determined value, and excluding the first community on the search result page.

16. A system configured to search on-line communities and provide information on online communities, the system comprising:
a searcher implemented in at least one computing device and configured to search communities using a search word provided from a user terminal through a network;
a reliability estimator implemented in at least one computing device and configured to determine a reliability value for each of the plurality of located communities using at least one reliability factor selected from the group consisting of a community user reliability index and a community activity index, the reliability value being indicative of how reliable information from each community is, wherein the community user reliability index for a particular one of the searched communities is determined based on reliability indices of users registered with the particular community, wherein the community activity index for the particular community is determined based on activities of users registered with the particular community; and
a search result generator implemented in at least one computing device and configured to arrange the searched communities in a search result based on & reliability value for each of the searched communities that is determined by the reliability estimator.

17. The system of claim 16, wherein the reliability estimator comprises:
a reliability index determination module configured to determine the community user reliability index to indicate the reliability of the contents provided by a community user;
an activity index determination module configured to determine the community activity index to indicate frequency by which the community user performs community activities; and
a reliability generation module configured to generate the reliability value for each of the searched communities based on at least one of determinations provided by the reliability index determination module and the activity index determination module.

18. The system of claim 17, wherein at least one of the community user reliability index, and the community activity index, is established to be the reliability factor configured to determine the reliability value for each of the searched communities, and the system further comprises a search controller configured to selectively drive the reliability index determination module and the activity index determination module according to the established reliability factors.

19. The system of claim 18, wherein the system is connected to a community server configured to provide a community service through a network, wherein the community server comprises:
a database configured to store information having at least one of the number of visitors who visit corresponding communities during a predetermined time period for each community, the reliability indices of corresponding community users, the number of contents posted in the corresponding communities during a predetermined time, and the number of other communities having a relationship with corresponding communities.

20. The system of claim 19, wherein the system further comprises at least one of:
a visitor monitoring module configured to monitor visitor access status for each community, and counting the number of visitors according to the monitored result;
a contents posting monitoring module configured to monitor users' posting of contents for each community, and counting the number of contents according to the monitored result; and
a relationship generation monitoring module configured to monitor a request of generation of a relationship by a user of another community for each community, and counting the number of generated relationships according to the monitored result.

21. A method of operating a community search service, the method comprising:
searching communities using a search word provided from a user through a network, wherein searching is conducted using a computing device comprising a processor and a memory;
determining a community user reliability index for each of the searched communities based on reliability indices of users registered with the searched communities;
determining a community activity index for each of the searched communities based on activities of users registered with the searched communities;
determining a community reliability value of each searched community using at least one of the community user reliability index and the community activity index, the community reliability value being indicative of how reliable information from each community is; and
sorting the searched communities based on the community reliability values in a search result for providing to the user.

* * * * *